United States Patent
Peng et al.

(10) Patent No.: US 9,551,831 B1
(45) Date of Patent: Jan. 24, 2017

(54) PLUGGABLE LC ADAPTOR HAVING OPTICAL PASSIVE ELEMENT

(71) Applicant: Alliance Fiber Optic Products, Inc., Sunnyvale, CA (US)

(72) Inventors: Xiaotao Peng, Fremont, CA (US); Shiping Zhang, Dongguan (CN); Kuofu Hsu, New Taipei (TW); Andy Fenglei Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 14/545,537

(22) Filed: May 18, 2015

(51) Int. Cl.
G02B 6/26 (2006.01)
G02B 6/38 (2006.01)
G02B 6/32 (2006.01)

(52) U.S. Cl.
CPC .............. G02B 6/264 (2013.01); G02B 6/325 (2013.01); G02B 6/387 (2013.01); G02B 6/3825 (2013.01); G02B 6/3874 (2013.01); G02B 6/3893 (2013.01)

(58) Field of Classification Search
CPC .................................. G02B 6/12; G02B 6/23
USPC ......................................................... 385/61
See application file for complete search history.

(56) References Cited

U.S. PATENT DOCUMENTS

| 5,963,684 A * | 10/1999 | Ford et al. ................... 385/24 |
| 6,102,581 A | 8/2000 | Deveau et al. |
| D467,544 S | 12/2002 | Hwang |
| 7,387,527 B2 | 6/2008 | Kim et al. |
| 2003/0081897 A1* | 5/2003 | Itoh et al. .................. 385/34 |
| 2003/0179993 A1* | 9/2003 | Shigenaga et al. ............ 385/33 |
| 2004/0175073 A1* | 9/2004 | Grinderslev et al. .......... 385/34 |
| 2004/0223678 A1* | 11/2004 | He et al. ........................ 385/11 |
| 2005/0110157 A1* | 5/2005 | Sherrer et al. ............... 257/776 |
| 2009/0110347 A1* | 4/2009 | Jacobsson ...................... 385/16 |
| 2009/0154930 A1 | 6/2009 | Hinderthuer |
| 2010/0316344 A1* | 12/2010 | Bylander et al. ............ 385/134 |
| 2013/0004128 A1* | 1/2013 | Zhang .......................... 385/79 |
| 2013/0044978 A1* | 2/2013 | DeDobbelaere et al. ...... 385/33 |
| 2013/0141672 A1* | 6/2013 | Smith ........................... 349/86 |

\* cited by examiner

*Primary Examiner* — Kaveh C Kianni
(74) *Attorney, Agent, or Firm* — Dinsmore & Shohl LLP

(57) ABSTRACT

A pluggable LC adaptor comprises a LC adaptor housing and an assembly, wherein the assembly is disposed in the LC adaptor housing. The assembly comprises: a first fiber collimator having a first lens; a first LC ferrule; a first fiber, where the first fiber is partially disposed inside the first LC ferrule and partially disposed inside the first fiber collimator; a second fiber collimator having a second lens; a second LC ferrule; a second fiber, where the second fiber is partially disposed inside the second LC ferrule and partially disposed inside the second fiber collimator; and an optical passive element disposed between the first collimator and the second collimator. The optical passive element may be a thin film filter or an isolator core.

12 Claims, 4 Drawing Sheets

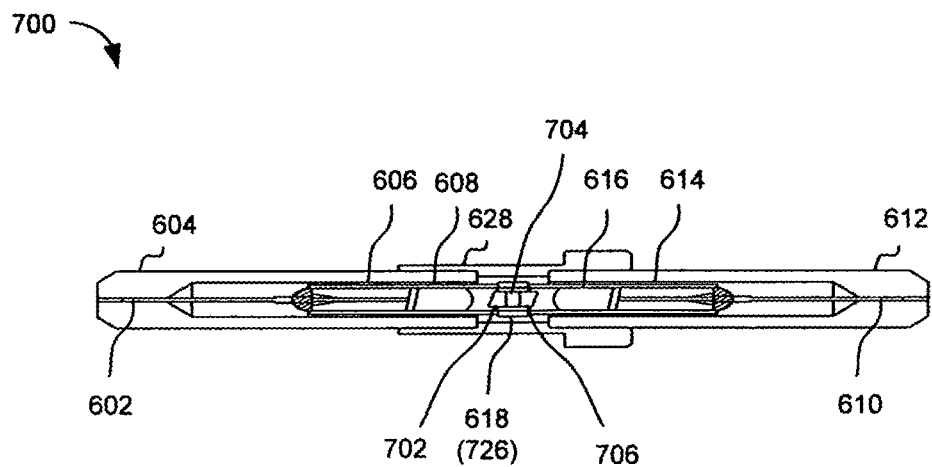
FIG. 7
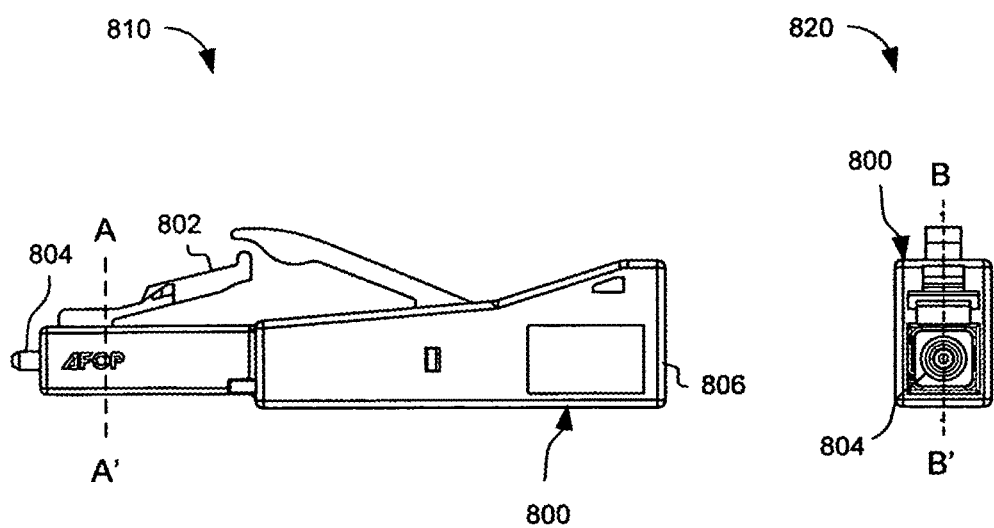
FIG. 8A
FIG. 8B

US 9,551,831 B1

PLUGGABLE LC ADAPTOR HAVING OPTICAL PASSIVE ELEMENT

FIELD OF THE INVENTION

This invention relates to pluggable LC adaptors, and more specifically relates to pluggable LC adaptors having optical passive elements.

BACKGROUND OF THE INVENTION

Pluggable optical devices are keys to many optical fiber applications. Cost effective and reliable pluggable optical devices having low insertion loss and versatile functions are constantly demanded in optical networks. Various small form factor (SFF) pluggable optical devices have been developed and broadly deployed in Telecom and Data Center applications.

The pluggable optical device typically has one input port and one output port, which is applied to optical fiber communications. The optical signal may travel through the pluggable optical device entering to the input port and exiting from the output port of the device. In some embodiments, electronic interface is integrated in the pluggable device for system control. In some passive optical network applications, electronic control may not be required.

FIG. 1 schematically shows a Metro network 100. Network 100 comprises a plurality of nodes including a node 102. Network 100 comprises a plurality of optical signals having various wavelengths, for example, wavelengths defined in dense wavelength division multiplexing (DWDM) or WDM. For example, network 100 drops a wavelength at node 102. In other words, optical signal having a wavelength 1 is directed out from network 100, while optical signals having other wavelengths remain in the network.

A thin film filter (TFF) may transmit light having a specific wavelength band, and reflect light having wavelengths outside the specific wavelength band. An optical element comprising a thin film filter may be used to drop a wavelength from the network, which typically has two fiber pigtails at its both ends. The optical element may be easily connected to Metro network 100 using a LC connector 104 as shown schematically in FIG. 1. At least one fiber pigtail may be held by a LC connector.

The LC connector is a popular small form factor connector. This interface was developed by Lucent Technologies (hence, Lucent Connector or LC). It uses a retaining tab mechanism, similar to a phone or RJ45 connector, and the connector body resembles the square shape of other older connectors. The diameter of the ferrule of an LC connector is 1.25 mm.

FIG. 2 schematically shows a next generation passive optical network (NGPON) 200. NGPON 200 comprises a plurality of fiber-to-the-home (FTTH) sites 202. Each FTTH site 202 may require to drop a wavelength and to block the remaining wavelengths using a thin film filter. Similarly, the thin film filter element may have two fiber pigtails. At least one fiber pigtail is held in a LC connector. The thin film filter element may be connected to NGPON 200 through a LC connector 204.

In both Metro network and NGPON applications, and also other applications, pluggable optical devices having no fiber pigtails, which have small form factor and are cost effective, versatile, and easy for field deployment, are demanded. More specifically, pluggable LC adaptors compatible with LC connector jacks of a network having passive optical elements are demanded.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 7 schematically shows a cross-section of isolator assembly in a pluggable LC adaptor having reduced length.

FIG. 8A shows an external view of an exemplary pluggable LC adaptor.

FIG. 8B shows another external view of an exemplary pluggable LC adaptor.

Figure 1:
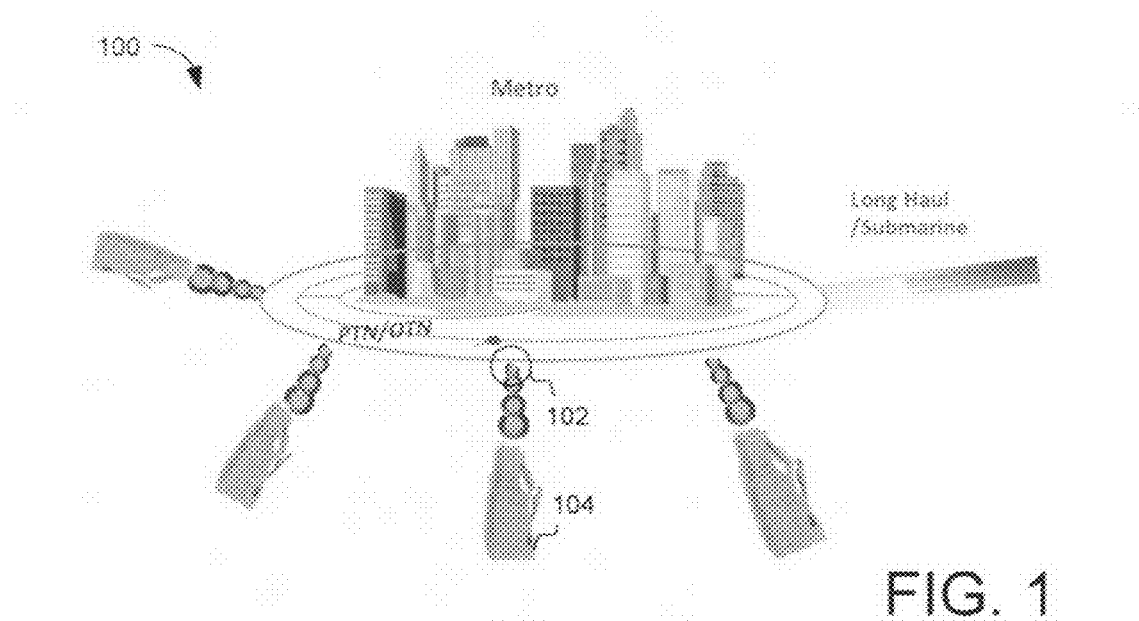
FIG. 1 schematically shows a Metro network.
Figure 2:
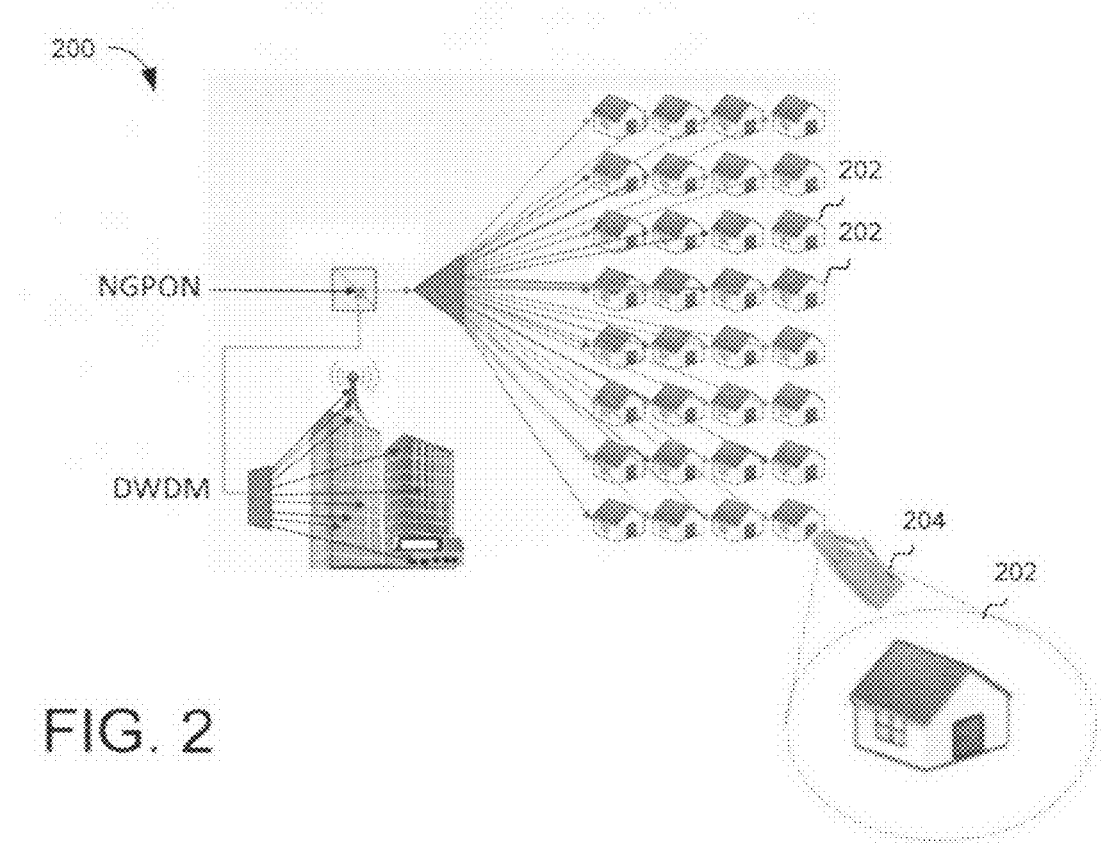
FIG. 2 schematically shows a next generation passive optical network.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 3:
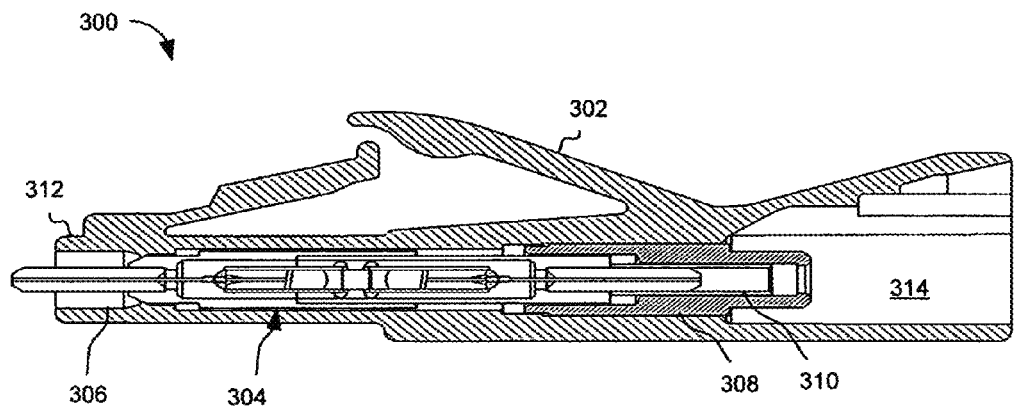
FIG. 3 schematically shows a cross-section of a pluggable LC adaptor.

FIG. 3 schematically shows a cross-section of a pluggable LC adaptor 300 in accordance with an embodiment of the present invention. Pluggable LC adaptor 300 comprises a LC adaptor housing 302 and an assembly 304 of optical passive element. Assembly 304 is disposed in LC adaptor housing 302.

Figure 4:
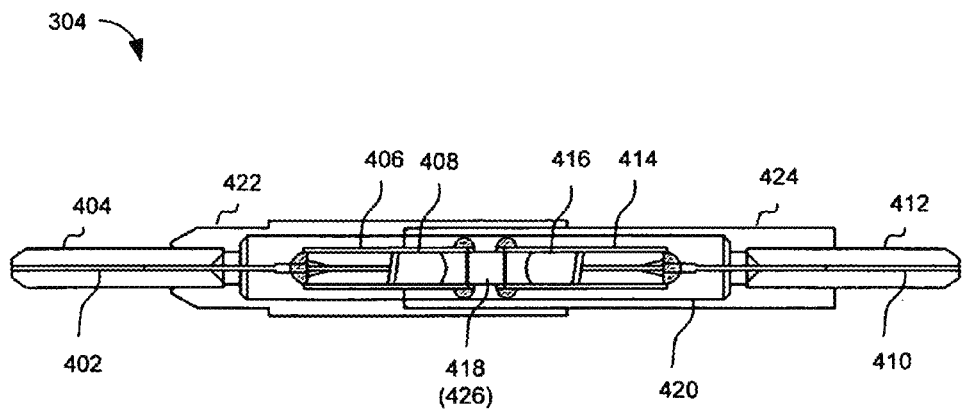
FIG. 4 schematically shows a cross-section of thin film filter assembly in a pluggable LC adaptor.

FIG. 4 schematically shows a cross-section of assembly 304 in accordance with an embodiment of the present invention. Assembly 304 comprises a first fiber 402. First fiber 402 is partially disposed inside a first LC ferrule 404 and partially disposed inside a first beam collimator 406. First beam collimator 406 comprises a first lens 408.

Assembly 304 further comprises a second fiber 410. Second fiber 410 is partially disposed inside a second LC ferrule 412 and partially disposed inside a second beam collimator 414. Second beam collimator 414 comprises a second lens 416. First beam collimator 406, second collimator 414, and an optical passive element 418 disposed between first collimator 406 and second collimator 414, are enclosed in a tube 420. First fiber 402 and second fiber 410 pass through tube 420. First beam collimator 406, optical passive element 418, and second collimator 414 are optically aligned. As shown in FIG. 4, the optical element 418 is adjacent to and contacting the first collimator 406 and the second collimator 414.

A first part of first LC ferrule 402 and a first part of tube 420 are held by a first housing 422. A second part of first LC ferrule 402 is protruding from first housing 422. A first part of second LC ferrule 412 and a second part of tube 420 are held by a second housing 424. A second part of second LC ferrule 412 is protruding from second housing 424. Second housing 424 is partially in first housing 422 together forming an integrated housing.

Assembly 304 is disposed in LC adaptor housing 302. A cylindrical spacer 306 may be disposed between LC adaptor housing 302 and first LC ferrule 404. A third housing 308 partially enclosing second housing 424 is disposed in LC adaptor housing 302. Third housing 308 comprises a sleeve 310. Second LC ferrule 412 is partially in sleeve 310.

In this manner, a front end 312 of pluggable LC adaptor 300 may be inserted into a jack of a LC connector, such that first fiber 402 in first LC ferrule is connected to a fiber from a first optical network. A cavity 314 of LC adaptor housing 302 at an opposite end to front end 312 may function as a jack to receive an inserted LC ferrule of another LC connector in sleeve 310, such that a fiber from a second optical network is connected to second fiber 410. Accordingly, an optical signal may be transmitted from the first optical network to the second optical network through pluggable LC adaptor 300, and vice versa.

In an embodiment, optical passive element 418 may be a thin film filter 426. A thin film filter transmits optical signals having a certain selected wavelength band, and blocks optical signals having wavelengths outside the selected wavelength band. Alternatively, a thin film filter reflects optical signals having a certain selected wavelength band, and transmits optical signals having wavelengths outside the selected wavelength band.

Light coming from first fiber 402 is collimated by first lens 408. The collimated beam is partially transmitted through thin film filter 426. The transmitted collimated beam is focused by second lens 416 into second fiber 410. Similarly, light coming from second fiber 410 is collimated by second lens 416. The collimated beam is partially transmitted through thin film filter 426. The transmitted collimated beam is focused by first lens 408 into first fiber 402.

Figure 5:
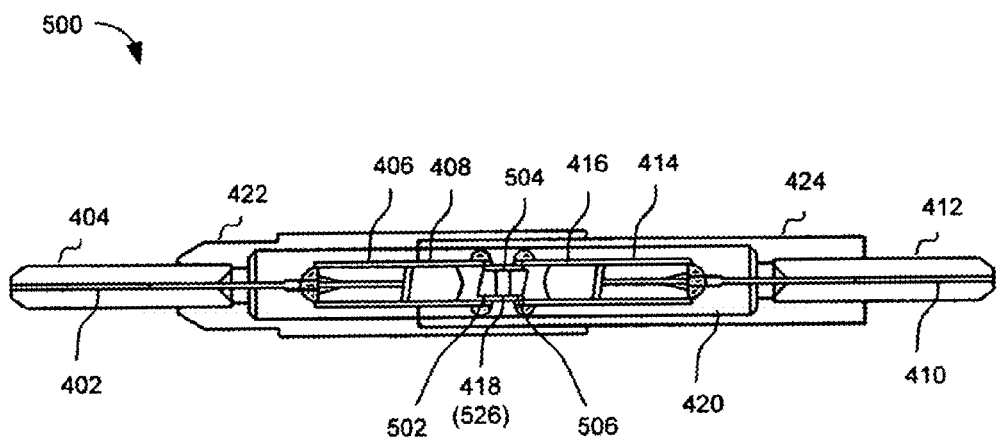
FIG. 5 schematically shows a cross-section of isolator assembly in a pluggable LC adaptor.

FIG. 5 schematically shows a cross-section of assembly 500 in accordance with an embodiment of the present invention. Assemble 500 may replace assembly 304 in pluggable LC adaptor 300 of FIG. 3, where assembly 500 is disposed in LC adaptor housing 302. FIG. 5 is similar to FIG. 4. For brevity, detailed descriptions of identical portions are omitted.

In an embodiment, optical passive element 418 may be an isolator core 526. As shown in FIG. 5, the isolator core 526 is adjacent to and contacting the first collimator 406 and the second collimator 414. Isolator core 526 may be a standard isolator core or a premium isolator core with polarization mode dispersion (PMD) compensation. Isolator core 526 may comprise a first birefringence wedge 502, a Faraday rotator 504, and a second birefringence wedge 506. It is appreciated that isolator core 526 may be any kind of isolators.

Isolators provide lasers with immunity from back reflection, thereby improving the signal to noise ratio for laser diode based transmitters. This is especially important for high data rate transceivers and transponders, or those devices requiring long span lengths between transceiver pairs. Isolator is directional. Depending on the direction of the Faraday rotator, the isolator may be made to allow light travels either from first fiber 402 to second fiber 410 or vice versa, but light cannot travel in both directions. Isolator core 526 allows light travelling in only one direction. The pluggable isolator LC adaptor may be placed in front of a laser (not shown) to enhance the isolation of back reflection.

Figure 6:
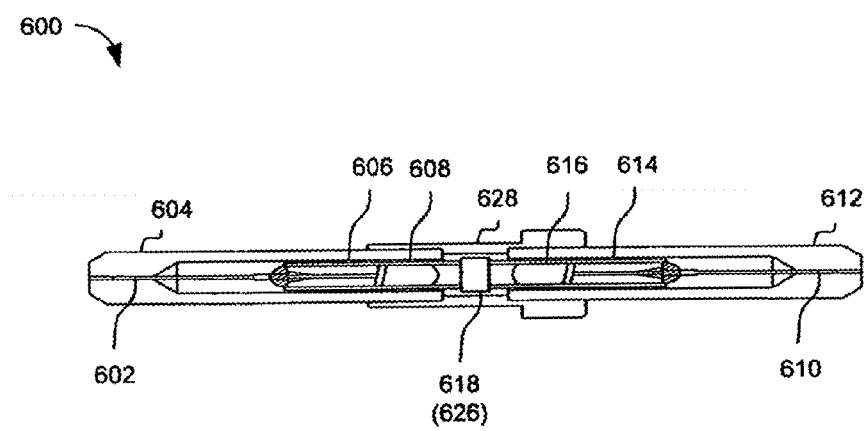
FIG. 6 schematically shows a cross-section of thin film filter assembly in a pluggable LC adaptor having reduced length.

FIG. 6 schematically shows a cross-section of assembly 600 in accordance with an embodiment of the present invention. Assemble 600 may replace assembly 304 in pluggable LC adaptor 300 of FIG. 3, where assembly 600 is disposed in LC adaptor housing 302.

Assembly 600 comprises a first fiber 602. First fiber 602 is partially disposed inside a first LC ferrule 604 and partially disposed inside a first beam collimator 606. First beam collimator comprises a first lens 608. Assembly 600 further comprises a second fiber 610. Second fiber 610 is partially disposed inside a second LC ferrule 612 and partially disposed inside a second beam collimator 614. Second beam collimator 614 comprises a second lens 616.

First LC ferrule 604 comprises a cavity holding first collimator 606. Second LC ferrule 612 comprises a cavity holding second collimator 614. An optical passive element 618 is disposed between first collimator 606 and second collimator 614. First collimator 606, optical passive element 618, and second collimator 614 are optically aligned. A connecting tube 628 may hold first LC ferrule 604, optical passive element 618, and second LC ferrule 612 to form an integrated assembly 600. In this manner, the length of assembly 600 is reduced as compared with the length of assembly 304 and the length of assembly 500.

In an embodiment, optical passive element 618 may be a thin film filter 626. Light coming from first fiber 602 is collimated by first lens 608. The collimated beam is partially transmitted through thin film filter 626. The transmitted collimated beam is focused by second lens 616 into second fiber 610. Similarly, light coming from second fiber 610 is collimated by second lens 616. The collimated beam is partially transmitted through thin film filter 626. The transmitted collimated beam is focused by first lens 608 into first fiber 602.

FIG. 7 schematically shows a cross-section of assembly 700 in accordance with an embodiment of the present invention. Assemble 700 may replace assembly 304 in pluggable LC adaptor 300 of FIG. 3, where assembly 700 is disposed in LC adaptor housing 302.

FIG. 7 is similar to FIG. 6. For brevity, detailed descriptions of identical portions are omitted. The difference of FIG. 7 from FIG. 6 is that in an embodiment, optical passive element 618 may be an isolator core 726. Isolator core 726 may be a standard isolator core or a premium isolator core with polarization mode dispersion (PMD) compensation. Isolator core 726 may comprise a first birefringence wedge 702, a Faraday rotator 704, and a second birefringence wedge 706. It is appreciated that isolator core 726 may be any kind of isolators.

Similar to isolator assembly of FIG. 5, isolator assembly of FIG. 7 is directional. Isolator core 726 allows light travelling in only one direction. The pluggable isolator LC adaptor may be placed in front of a laser (not shown) to enhance the isolation of back reflection.

Assembly 600 and assembly 700 are shorter than assembly 304 and assembly 500. Accordingly, the lengths of pluggable LC adaptor 300 may be reduced when pluggable LC adaptor 300 comprises assembly 600 or assembly 700. The pluggable LC adaptor having reduced length may be required in some applications.

FIG. 8A shows an external view 810 of an exemplary pluggable LC adaptor 800, in accordance with an embodiment of the present invention. Pluggable LC adaptor 800 comprises a latch 802 for engaging with a jack of a LC connector. Pluggable LC adaptor 800 comprises a LC ferrule 804 protruding from its main body for inserting into the jack of the LC connector. LC ferrule 804 may be first LC ferrule 404 of FIGS. 4 and 5 or first LC ferrule 604 of FIGS. 6 and 7. Pluggable LC adaptor 800 also comprises a jack 806 for accepting a LC ferrule of another LC connector. Jack 806 may be cavity 314 of FIG. 3.

FIG. 8B shows another external view 820 of exemplary pluggable LC adaptor 800 parallel to line AA' of FIG. 8A, in accordance with an embodiment of the present invention. FIG. 8B also shows LC ferrule 804. FIGS. 3-7 are cross-sections parallel to line BB' of FIG. 8B.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A pluggable LC adaptor comprising:
   a LC adaptor housing and an assembly, wherein the assembly is disposed in the LC adaptor housing; and wherein the assembly comprises:
   a first fiber collimator comprising a first lens;
   a first LC ferrule;
   a first fiber, wherein the first fiber is partially disposed inside the first LC ferrule and partially disposed inside the first fiber collimator;
   a second fiber collimator comprising a second lens;
   a second LC ferrule;
   a second fiber, wherein the second fiber is partially disposed inside the second LC ferrule and partially disposed inside the second fiber collimator;
   an isolator core disposed between the first collimator and the second collimator, the isolator core positioned adjacent to and contacting the first collimator and the second collimator; and
   a tube within which the first fiber, the second fiber, the first collimator, the isolator core, and the second collimator are optically aligned.

2. The pluggable LC adaptor of claim 1, wherein the isolator core allows light travelling through the first fiber and the second fiber to travel in only one direction.

3. The pluggable LC adaptor of claim 2, wherein the isolator core comprises a first birefringence wedge, a Faraday rotator, and a second birefringence wedge.

4. The pluggable LC adaptor of claim 1, wherein the assembly further comprises:
   a first housing holding a first part of the first LC ferrule and a first part of the tube, wherein a second part of the first LC ferrule is protruding from the first housing; and
   a second housing holding a first part of the second LC ferrule and a second part of the tube, wherein a second part of the second LC ferrule is protruding from the second housing.

5. The pluggable LC adaptor of claim 4 further comprising:
   a third housing partially enclosing the second housing, wherein the third housing is disposed in the LC adaptor housing, and wherein the third housing comprises a sleeve, the second LC ferrule partially in the sleeve.

6. The pluggable LC adaptor of claim 1, wherein the first LC ferrule comprises a cavity holding the first collimator, and the second LC ferrule comprises a cavity holding the second collimator.

7. The pluggable LC adaptor of claim 6, wherein a connecting tube holds the first LC ferrule, the optical passive element, and the second LC ferrule.

8. The pluggable LC adaptor of claim 6, wherein the optical passive element is a thin film filter.

9. The pluggable LC adaptor of claim 8, wherein the thin film filter transmits light having a specific wavelength band and reflects light having wavelengths outside the specific wavelength band.

10. The pluggable LC adaptor of claim 1 further comprising a jack for accepting a LC ferrule of a first LC connector, wherein the first LC ferrule is inserted into a jack of a second LC connector.

11. The pluggable LC adaptor of claim 10, wherein the jack comprises a cavity and a sleeve.

12. The pluggable LC adaptor of claim 1, wherein a diameter of the first LC ferrule is 1.25 mm.

* * * * *